(12) United States Patent
Aksoy et al.

(10) Patent No.: US 10,046,603 B2
(45) Date of Patent: Aug. 14, 2018

(54) PNEUMATIC RADIAL TIRE

(71) Applicant: KORDSA GLOBAL ENDÜSTRIYEL IPLIK VE KORD BEZI SANAYI VE TICARET ANONIM SIRKETI, Kocaeli (TR)

(72) Inventors: Kürsat Aksoy, Kocaeli (TR); Saadettin Fidan, Garbsen (DE); Bekir Anil Mertol, Kocaeli (TR)

(73) Assignee: KORDSA GLOBAL ENDÜSTRIYEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 226 days.

(21) Appl. No.: 15/108,563

(22) PCT Filed: Dec. 23, 2014

(86) PCT No.: PCT/IB2014/067254
§ 371 (c)(1),
(2) Date: Jun. 27, 2016

(87) PCT Pub. No.: WO2015/097655
PCT Pub. Date: Jul. 2, 2015

(65) Prior Publication Data
US 2016/0318341 A1    Nov. 3, 2016

(30) Foreign Application Priority Data
Dec. 25, 2013   (TR) .................................. 2013/15261

(51) Int. Cl.
*B60C 9/18*    (2006.01)
*B60C 9/22*    (2006.01)
*B60C 9/00*    (2006.01)
*B60C 9/20*    (2006.01)

(52) U.S. Cl.
CPC .......... *B60C 9/0042* (2013.01); *B60C 9/2009* (2013.01); *B60C 9/2204* (2013.01); *B60C 2009/1828* (2013.01); *B60C 2009/2038* (2013.01); *B60C 2009/2214* (2013.01); *B60C 2009/2223* (2013.01); *B60C 2009/2252* (2013.01); *B60C 2009/2261* (2013.01); *B60C 2009/2271* (2013.01); *B60C 2009/2285* (2013.01)

(58) Field of Classification Search
CPC .... B60C 9/18; B60C 9/20; B60C 9/22; B60C 9/2204
See application file for complete search history.

(56) References Cited

U.S. PATENT DOCUMENTS 4,883,629 A * 11/1989 Lang .................... B60C 9/0042
                                                    264/289.6

FOREIGN PATENT DOCUMENTS

DE           2022748           * 11/1970

* cited by examiner

*Primary Examiner* — Justin R Fischer
(74) *Attorney, Agent, or Firm* — Gokalp Bayramoglu

(57) ABSTRACT

Pneumatic radial tire (1) having improved high speed durability and low flatspot feature, and which has polyethylene terephthalate cap ply reinforcement layer (6). The objective is to provide a pneumatic radial tire (1) wherein the pressure on the belt package (5) is increased at high speed and high temperature by increasing the thermal shrinkage force of the cap ply cord.

7 Claims, 1 Drawing Sheet

PNEUMATIC RADIAL TIRE

FIELD OF THE INVENTION

The present invention relates to pneumatic radial tire with high speed durability and low flatspot feature, and a polyethylene terephthalate cap ply reinforcement layer.

BACKGROUND OF THE INVENTION

It is known that reinforcement materials that are placed with a small angle relative to the equatorial plane (wound spirally) on the belt package especially improve the high speed performance in radial tires. Using polymeric (nylon 6.6, PET, aramide/nylon hybrid etc.) cords as cap ply reinforcement by being wound on the belt package spirally as strips has been applied for many years by several companies in order to improve high speed durability and handling performance in pneumatic radial tires. The cord strips are obtained by cutting calendered (rubberized) cord fabric in strips or rubberizing parallel single cords in a certain width during extrusion process.

The purpose of using the cap ply reinforcement is to increase the high speed durability of the tire by avoiding belt layer separation caused by the centrifugal force occurring in the belt package at high speeds. The intensity of the resistance shown by the tire against belt edge separations is highly important, for high speed durability.

When nylon is used as cap ply reinforcement material, there are two important disadvantages: first, the obligation to use more than one layer due to its low modulus, second, the temporary geometric deformation (temporary flatspot) caused as a result of cooling the tire heated at high speeds upon parking, since the glass transition temperature of the polymer is low.

U.S. Pat. No. 7,584,774, an application known in the state of the art, discloses the use of high modulus polyethylene terephthalate cord as cap ply reinforcement material in order to increase the high speed durability of a tire and decrease the temporary geometric deformation (flatspot) problem. In this embodiment the tangent modulus of the cap ply cord is suggested being higher than 2.5 mN/dtex. % at 16° C. under 29.4 N. For this reason, it is suggested that the process expansion will be a maximum of 2% to avoid tight cord formation which can cut through the rubber coating of the belt.

In order to increase the high speed durability of the tire, the cap ply reinforcement cords located on the belt package should resist the tire growth that can occur from the centrifugal force at high speeds.

The said tire growth resistance formed in the cap ply reinforcement cords is comprised the total of A. force/stress (cold residual tension) occurring in the cap ply reinforcement cords after vulcanization process, B. thermal shrink force generated doe to increasing temperature of the belt zone because of high speed, C. and the cord modulus at the said temperature.

SUMMARY OF THE INVENTION

The objective of the present invention is to provide a pneumatic radial tire wherein the pressure on the belt package is increased at high speed and high temperature by increasing thermal shrinkage force of the cap ply cords.

In order to achieve this purpose, it is suggested to use lower modulus polyethylene terephthalate instead of high modulus polyethylene terephthalate as in U.S. Pat. No. 7,584,774. The efficiency of this polyethylene terephthalate cord is increased by increasing its thermal shrink force. Depending on the increasing temperature at high speed, the modulus of the polyethylene terephthalate cord decreases, whereas its thermal shrink force increases. This increase in the polyethylene terephthalate present in the inventive pneumatic radial tire is significantly higher than that of the previous art (U.S. Pat. No. 7,584,774).

BRIEF DESCRIPTION OF THE DRAWINGS

"Pneumatic radial tire" developed to fulfill the objectives of the present invention is illustrated in the accompanying figures, in which.

DETAILED DESCRIPTION OF THE INVENTION

Figure 1:
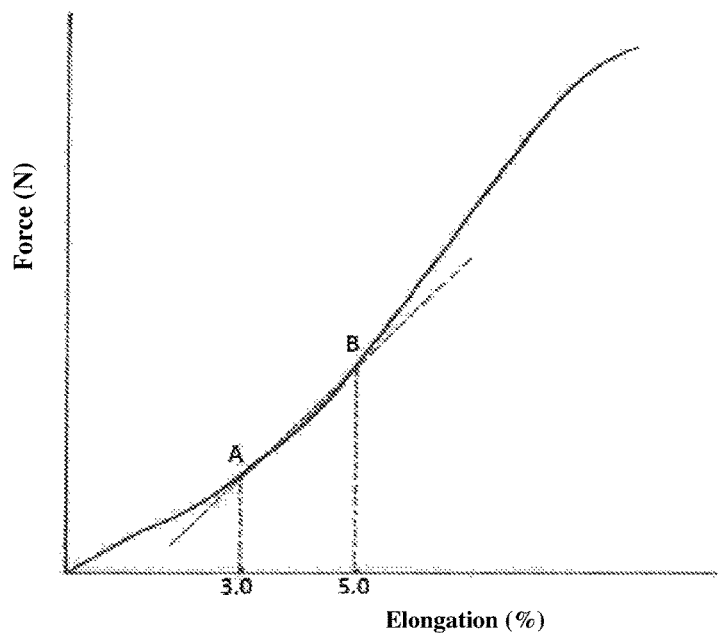
FIG. 1 is the load-elongation curve of the polyethylene terephthalate cord at 160° C.
Figure 2:
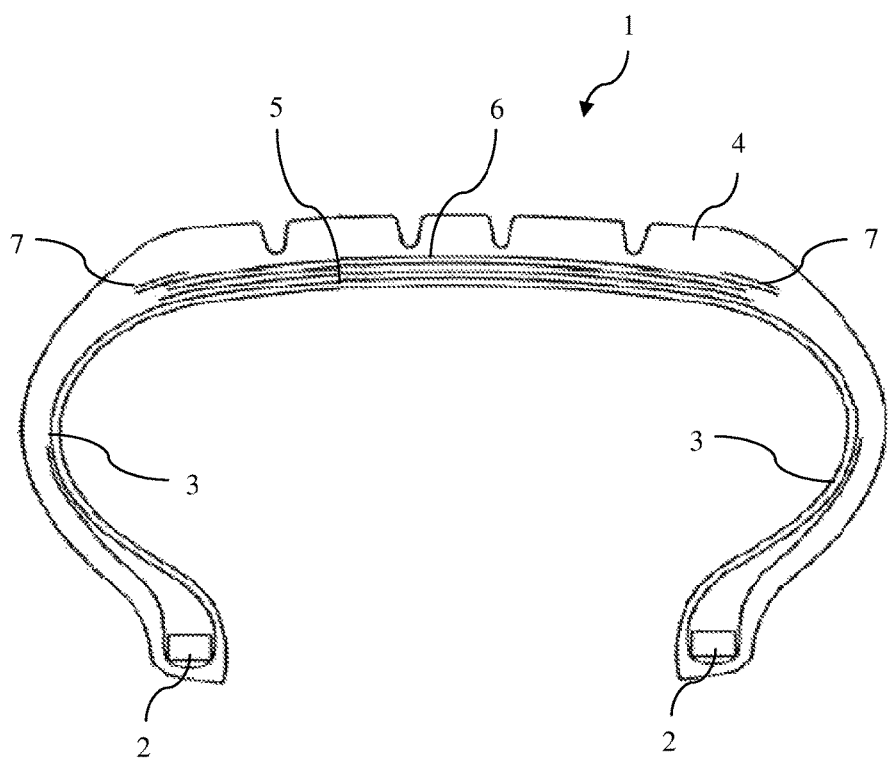
FIG. 2 is the cross sectional view of the inventive pneumatic radial tire.

The components shown in the figures are each given reference numbers as follows:
1. Pneumatic radial tire
2. Tire bead ring
3. Carcass
4. Tread
5. Belt
6. Cap ply reinforcement layer
7. Belt edge reinforcement layer (cap ply, cap strip)

The inventive pneumatic radial tire (1) has cap ply reinforcement strips which are formed with low modulus polyethylene terephthalate cords the thermal shrinkage force of which is increased by applying a special heat-set process in order to increase the high speed durability.

The said heat-set process, which is a thermal treatment, comprises the relaxation of the polyethylene terephthalate cord between 1-3% at 220-240° C., and then cold stretching between 1-5% at 140-200° C. This process keeps the cord modulus between determined values (in range of 2.0-2.5 mN/dtex % at 160° C.), and it raises the thermal shrinkage force above 2.0 mN/dtex at 177° C. In heat-set process, the polyethylene terephthalate cords are also treated with RFL dipping solution and adhesion with the rubber in tire is provided. The glass transition temperature of polyethylene terephthalate is higher than that of nylon 6.6 which causes less flatspot in the tire.

The polyethylene terephthalate cords comprising the reinforcement strips used in the inventive pneumatic radial tire (1) have a secant modulus value in range of 2.0-2.5 mN/dtex. % between 3-5% elongations at 160° C. In other words, the said values represent the slope of the line (for 1% elongation) combining A and B points in FIG. 1.

The secant modulus value is calculated as follows:

$$\text{Secant modulus} = (\%5 \text{ LASE} - \%3 \text{ LASE})/(\text{linear cord density}). \quad (5\text{-}3)$$

wherein

LASE: Load At Specified Elongation (mN)

Linear cord density is gram value of 10.000 length of a yarns in cord (dtex) Elongation range (5-3) is the % elongation value.

In the inventive pneumatic radial tire (1), the thermal shrinkage force is increased above 2.0 mN/dtex at 177° C. in order to increase the pressure of the cords on the belt package at high speed and temperature. A modulus over 2.5 mN/dtex. % may cause over-stretched cords during production process of the tire. Since a modulus below 2.0 mN/dtex. % will also cause a decrease in thermal shrinkage force, a modulus below 2.0 N/dtex % cannot provide sufficient pressure on the belt package. Since the thermal shrink force will increase as a function of the temperature, a minimum 2.0 mN/dtex value at 177° C. will positively affect (compensate) the cord modulus decreasing at high temperature, and it will help to form sufficient pressure on the belt package.

The cap ply reinforcement cords can be wound on the belt package as single or double cord or as strips the width of which changes between 5 mm to 30 mm, preferably 8 mm to 15 mm. The said strips can be applied as coated with rubber (calendered) or ready to use without coating with rubber. The number of cords present in a 10 mm width of the strips can vary between 5 to 20.

The linear densities of the PET cords in the cap ply strip may vary between 300 to 6000 dtex, preferably 800 to 3500 dtex. The cord twist level of the PET cords on the cap ply strip may vary between 100 and 800 tpm (turns per meter), preferably 200 to 400 tpm.

In the inventive pneumatic radial tire (1), the secant modulus value of the cord at 160° C. is lower relative to the conventional embodiments. However, the difference in secant, modulus is balanced by the high thermal shrinkage force. Polyethylene terephthalate cap ply reinforcement cord used in the inventive pneumatic radial tire (1) has a secant modulus below 2.5 mN/dtex % between elongations of 3 to 5% at 160° C., but above 2.0 mN/dtex %. Furthermore, thermal shrinkage force measured at 177° C. according to ASTM D885 is higher than 2.0 mN/dtex.

The invention claimed is:

1. A pneumatic radial tire comprising:
   a plurality of polyethylene terephthalate cords;
   at least one cap ply reinforcement strip;
   wherein, the at least one cap ply reinforcement strip is formed of the polyethylene terephthalate cords and is wound onto a belt package;
   wherein, the secant modulus of the cords is between 2.0 and 2.5 mN/dtex. % at 160° C. between elongations of 3 to 5%;
   wherein, the thermal shrinkage force of the cords is above 2.mN/dtex at 177° C. (according to ASTM D885);
   and wherein, the cords are obtained by relaxation of 1 to 3% at 220-240° C., and then cold stretching between 1 to 5% at 140-200° C.

2. The pneumatic radial tire according to claim 1, wherein the cords, either singly or doubly, or strips made up of multiple cords, are wound spirally on the belt package, and the width of the strips is between 5 and 30 mm.

3. The pneumatic radial tire according to claim 1, wherein the number of cords in a 10 mm width of cap ply reinforcement strip varies between 5 and 20.

4. The pneumatic radial tire according to claim 1, wherein the linear density of the cords varies between 300 to 6000 dtex.

5. The pneumatic radial tire according to claim 1, wherein the twist level of the cords is between 100 to 800 tpm (turns per meter).

6. The pneumatic radial tire according to claim 1, wherein the at least one cap ply reinforcement strip is wound spirally on the belt package with an angle of 0 to 5 degrees with the equatorial plane in order to create a cap ply reinforcement layer.

7. The pneumatic radial tire according to claim 6, wherein a width of the cap ply reinforcement layer is equal to or greater than a width of a belt layer below the cap ply reinforcement layer.

\* \* \* \* \*